United States Patent [19]

Cornelison

[11] Patent Number: 5,118,475

[45] Date of Patent: Jun. 2, 1992

[54] CORE ELEMENT AND CORE FOR ELECTRICALLY HEATABLE CATALYTIC CONVERTER

[75] Inventor: Richard C. Cornelison, Hiram, Ohio

[73] Assignee: W. R. Grace & Co.-Conn., New York, N.Y.

[21] Appl. No.: 406,361

[22] Filed: Sep. 12, 1989

[51] Int. Cl.⁵ .................................................. F01N 3/28
[52] U.S. Cl. .................................... 422/174; 422/177; 422/180; 422/211; 422/222; 60/300; 60/303; 55/DIG. 30; 502/439; 502/527; 428/116; 428/593
[58] Field of Search ............... 422/174, 177, 180, 211, 422/222; 60/300, 303; 502/527, 439; 428/116, 593; 55/DIG. 30

[56] References Cited

U.S. PATENT DOCUMENTS

| | | |
|---|---|---|
| 3,768,982 | 10/1973 | Kitzner et al. .................... 23/288 F |
| 3,770,389 | 10/1973 | Kitzner et al. .................... 23/288 F |
| 4,186,172 | 1/1980 | Scholz ................................ 422/180 |
| 4,282,186 | 8/1981 | Nonnenmann et al. ........... 422/180 |
| 4,300,956 | 11/1981 | Rosenberger et al. ............. 148/6.3 |
| 4,576,800 | 3/1986 | Retallic .............................. 422/180 |
| 4,711,009 | 12/1987 | Cornelison et al. ............. 29/157 R |
| 4,928,485 | 5/1990 | Whittenberger .................... 60/299 |

Primary Examiner—Lynn Kummert
Attorney, Agent, or Firm—Edward J. Cabic

[57] ABSTRACT

There is provided a core element, especially useful in fabricating an electrically heatable catalytic converter, which element comprises a thin stainless steel strip having an area on at least one surface coated with a masking alloy, especially a nickel-containing brazing alloy, and a contiguous area coated with a refractory metal oxide, e.g., alumina. This structure enables the production of catalytic cores exhibiting minimum voltage drop at the interconnections between foil laminae to be heated electrically.

8 Claims, 2 Drawing Sheets

CORE ELEMENT AND CORE FOR ELECTRICALLY HEATABLE CATALYTIC CONVERTER

This invention relates, as indicated, to a novel core element, and a novel electrically heatable catalytic converter core formed therefrom. The electrically heatable catalytic cores may be encased in a suitable housing for use as a catalytic converter for internal combustion engine exhaust.

BACKGROUND OF THE INVENTION AND PRIOR ART

A significant volume of pollutant materials, e.g., carbon monoxide, unburned hydrocarbons and the like, are generated at the time of start-up by internal combustion engines, whether stationary or mobile, and whether spark or compression ignited. The reason for this is that it takes a finite amount of time, e.g. 15 to 60 seconds, for the catalyst in the catalytic converter, now generally associated with such engines, to reach optimum conversion temperature from the heat of the exhaust alone. The catalyst is not optimally effective. To overcome this problem, there have been developed several types of electrically heatable catalytic converters which shorten the time within which the catalytic converter reaches optimum operating temperature. Typical of the efforts in this direction are those of Kitzner as evidenced by his U.S. Pat. Nos. 3,768,982 and 3,770,389 each dated Oct. 30, 1973. More recently, electrically heatable catalytic converter cores have been formed using the resistance of corrugated thin metal strips connected across a voltage source as a means of heating the core to a desired temperature (e.g., at least about 600 degrees F.). Reference may be had to the copending application of Cornelison and Whittenberger Serial No. 196,301, filed May 20, 1988.

The present invention is an improvement on the structures of the prior art and is based on the discovery that a refractory metal oxide, applied as a wash coat to a thin stainless steel strip and fired to fix the coating, (such as taught in the U.S. Pat. to Cornelison et al 4,711,009 dated Dec. 8, 1987) will not adhere to a masking agent, e.g., a brazing alloy, particularly a nickel brazing alloy or a silver brazing alloy. The refractory metal oxide, e.g. alumina, does not conduct electricity although it is a substrate of choice for a catalyst, such as a noble metal catalyst. The brazing alloy is conductive. Hence, one is now able to prepare a catalytic core element from a thin stainless steel strip with electrically conductive areas adjacent to catalyst containing areas, place a plurality of such core elements in stacked relation, and apply a potential through the electrically conductive areas and utilize the resistance of the thin metal laminae to effect heating of the entire core. The disclosure of the aforesaid Patent 4,711,009 is incorporated herein by reference thereto to obviate the necessity for reproducing large portions thereof herein.

BRIEF STATEMENT OF THE INVENTION

Briefly stated, therefore, the present invention is a thin stainless steel strip, e.g., ferritic stainless steel, having on at least one surface thereof, and preferably both surfaces, an area coated with a high melting alloy masking agent, such as a brazing alloy, and a contiguous area coated with a refractory metal oxide, e.g., alumina, zirconia, silica, titania, or mixtures thereof. The metal alloy is preferably a nickeliferous brazing alloy, e.g., a nickel/phosphorus or nickel/boron alloy such as produced and marketed by Fusion Incorporated of Willoughby, Ohio. The masking agent is desirably a relatively high melting alloy, e.g., one having a melting point above about 1500 degrees F. The contiguous area coated with a refractory metal oxide is desirably corrugated, and preferably corrugated in a nonnesting pattern, e.g., a chevron or herringbone pattern. The areas coated with the brazing alloy are preferably flattened to remove the corrugations to enable the establishment of good electrical contact between plural stacked layers.

BRIEF DESCRIPTION OF THE DRAWINGS

The invention will be better understood by having reference to the annexed drawings showing a preferred embodiment of the invention and wherein:

FIG. 3 is a perspective view of a catalytic converter wherein the catalytic core is as shown in FIG. 2.

DETAILED DESCRIPTION OF THE DRAWINGS

As indicated above, the present invention is a core element for an electrically heatable catalytic core. The core is encased in a suitable housing to form a catalytic converter which is adapted to be inserted into an exhaust line and attached to a voltage source to provide power for heating the core.

Figure 1:
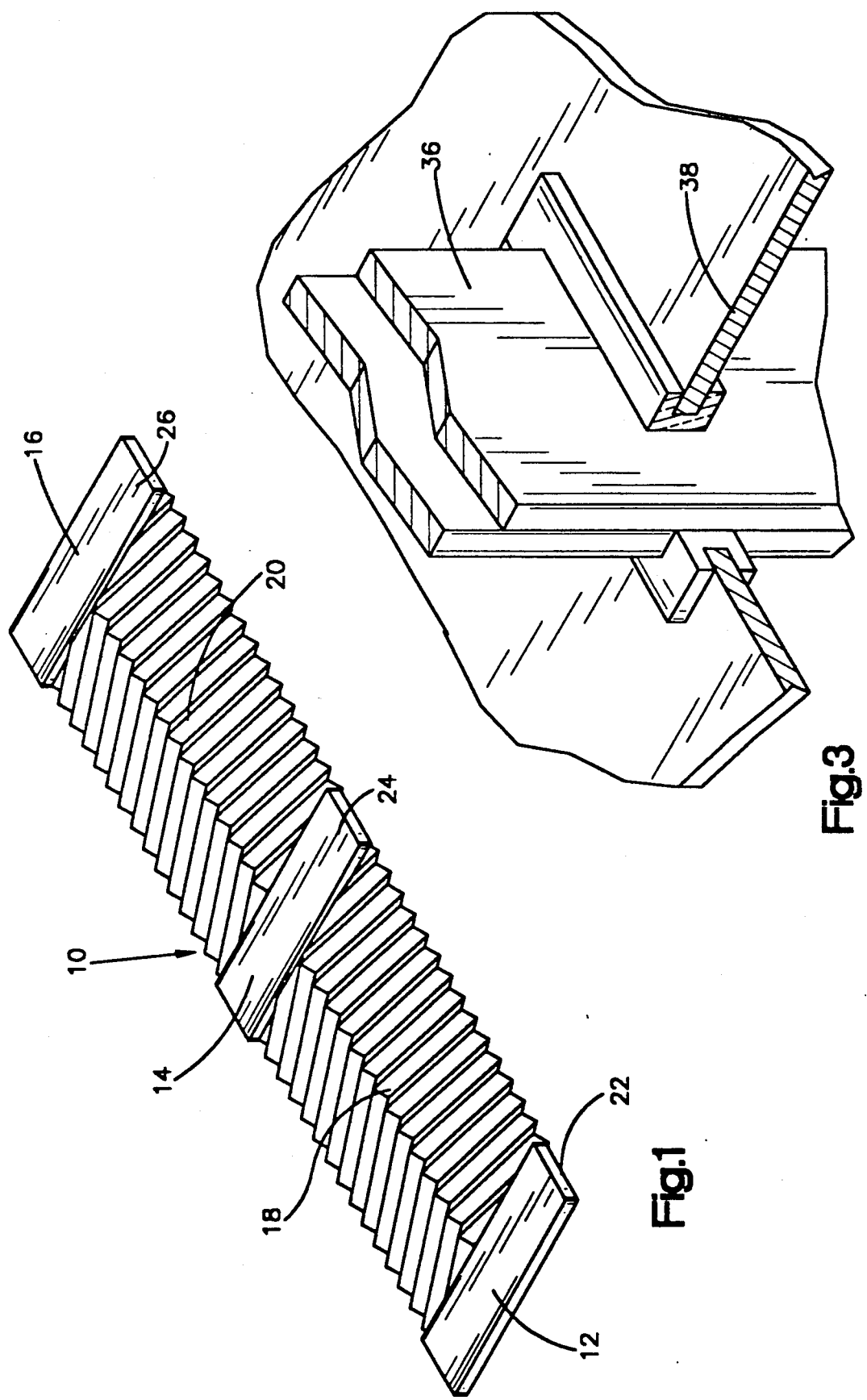
FIG. 1 is an isometric view showing a core element in accordance with the present invention.

Referring now, more particularly, to FIG. 1, there is here shown an isometric view of a core element 10 in accordance with the present invention. The core element 10 is formed from a continuous strip having a predetermined width, e.g., 3.5", corrugated by passing between corrugation gears from a leading edge to a trailing edge in accordance with the corrugation procedure set forth in the aforesaid U.S. Pat. No. 4,711,009. This strip is cut to predetermined desired lengths, e.g., 8". This length of corrugated thin metal strip is then placed in a press having a die adapted to flatten the end and central portions to provide the uncorrugated areas 12, 14, and 16, and leave the intermediate areas 18 and 20 untouched. By means of an air brush, a silk screen process, a rubber pad transfer process or any other suitable film transfer process, one or more layers of a commercially available masking agent, e.g., a brazing paste, is applied in a repeating pattern to both sides, e.g., the areas 12, 14, and 16, on the continuous web of corrugated thin metal foil and the resulting composite heated to a temperature sufficient to dry or fuse the brazing alloy to the foil and provide built-up portions 22, 24, and 26. The built up portions 22, 24 and 26 may have flat stainless steel members later T.I.G. (tungsten/inert gas) welded thereto to provide a desired thickness, e.g., 1/16". An adhesive bonded brazing alloy may be employed in lieu of the film transfer process above described. After cooling, the assembly is wash coated in the conventional manner using a slurry of alumina, or other refractory metal oxide, spray applied subsequently dried and calcined, or alumina is applied by plasma spray. Reference may be had to U.S. Pat. No. 4,829,655 to Cornelison et al dated May 16, 1989 for disclosure of a process for applying a coating of alumina to a stainless steel surface. As above indicated, it was found that the alumina would not adhere to the brazing alloy and could be easily brushed from the brazing alloy areas 12, 14, and 16. The wash coating of alumina upon firing adheres tenaciously to the corrugated thin metal foil substrate and provides a very desirable base for application of a catalyst, e.g., a noble metal catalyst, for example, platinum, palladium, rhodium, ruthenium, or a mixture or two or more such metals. The catalyst is applied as an aqueous solution containing the noble metal catalyst dissolved therein, and then firing to dry and to decmpose the catalyst containing compound to the metal.

At this point, the thickness of the electrically conductive areas 12, 14, and 16 may be built up to any desired thickness, in about 1/16" increments by welding or brazing additional thicknesses of stainless steel or other suitable electrically conductive metal thereto. The metals from which the core element 10 is fabricated should preferably be able to withstand temperatures up to at least about 2000 degrees F. without melting.

As above stated, the areas 18 and 20 are corrugated, preferably in a nonnesting pattern. A convenient nonnesting pattern is a chevron or herringbone pattern. When layers of the element 10 are built up, these patterns can be made nonnesting. For example, every other layer should be turned over and then stacked whereupon the corrugations become mismatched and do not nest together. Alternatively, the conductive strips may be made to space the successive layers 10 apart sufficiently to prevent nesting which would otherwise cause partial or complete blinding of the core formed therefrom to the passage of exhaust gas therethrough. It is desirable that the exhaust should undergo minimum pressure drop in passing through the catalytic converter.

Figure 2:
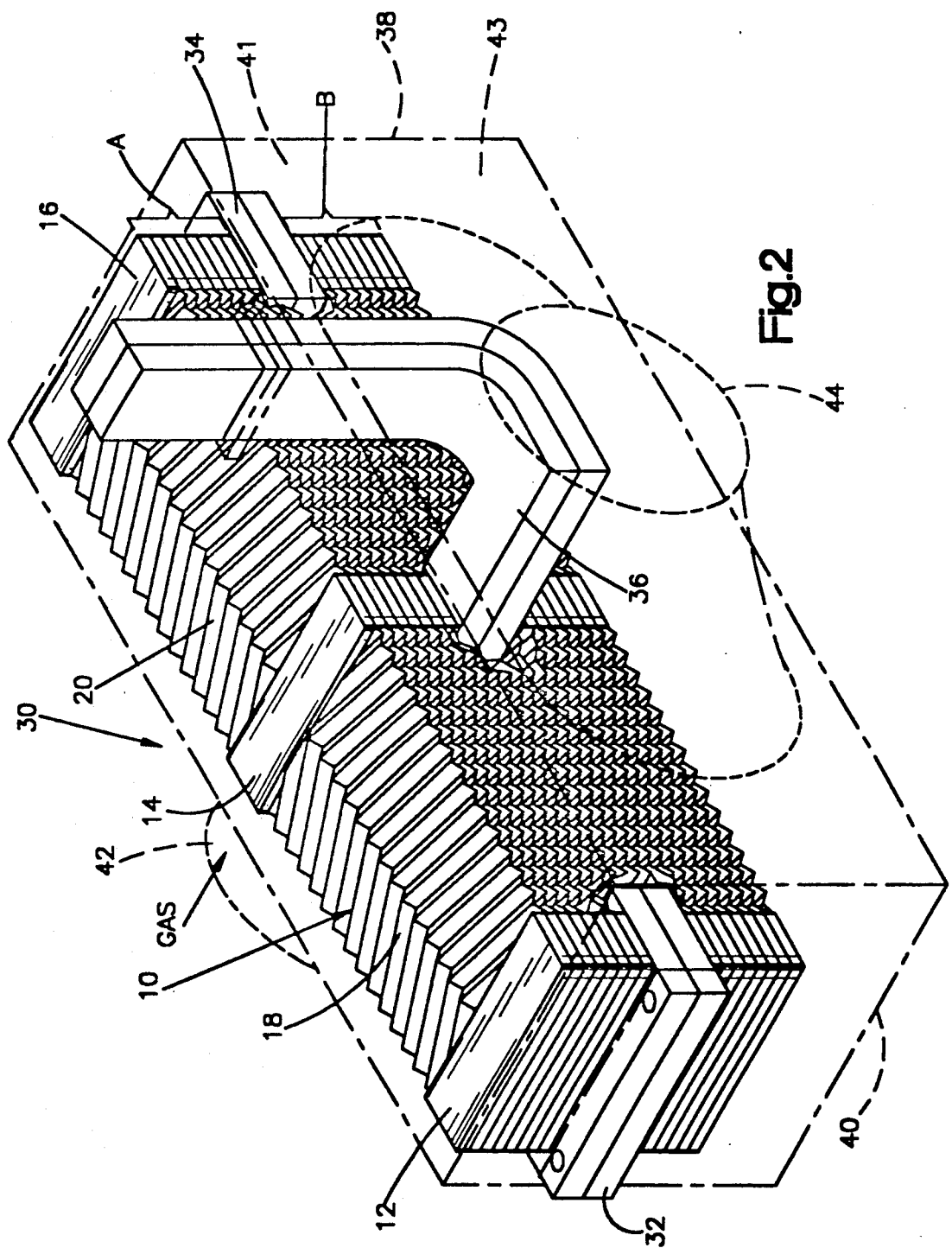
FIG. 2 is a perspective view showing a catalytic core built up of laminae of the core element shown in FIG. 1 and having electrical contacts for attachment across a voltage source, e.g., an automobile battery, not shown. A housing is shown in phantom.

FIG. 2 shows in perspective a catalytic core 30 formed by stacking a plurality of the core elements 10 one on top of the other with the end areas 12 and 16, and the central area 14 in registry. Generally, the device is formed from two such identical stacks, A and B. Negative potential buss bars 32 and 34 are provided at the central (vertically) part of the combined stacks A and B. Likewise, a positive potential buss bar 34 is located in the center (horizontally) of the combined stacks A and B, and provided with an extension 38 for suitably insulated passage through a housing 40 (FIG. 3). The buss bars 32, 34 and 36 are disposed between the two stack halves A and B and the stacks A and B compressed about the respective buss bars 32, 34 and 36. The negative terminals 32 and 34 may be directly connected to the housing 40 which, in turn, is attached directly to the chassis or frame carrying the engine, also at a negative potential by virtue of its direct attachment to the negative pole of the battery.

FIG. 3 shows in partially cut-away perspective, the catalytic core of FIG. 2 encased in a suitable housing 40. The housing 40 formed of two half shells 41 and 43 and is provided with an exhaust gas inlet 42 and an exhaust gas outlet 44. Also shown is the buss 36 extending through the housing 40 together with suitable insulation means 46 whereby the only contact between the positive and negative potentials is through the thin metal foil layers. If the current applied to the catalytic core 30 is high, e.g., about 600 amps, heating to an effective temperature can occur in as little is 5-10 seconds. Timed delay in starting for a short preheating period will enable this device to begin catalytic conversion immediately on initial engine cranking.

The devices of the present invention have a polycellular exhaust gas intercepting face characterized by a plurality of cell openings. Although contiguous layers will provide generally 4-sided diamond-shaped cells, the layers may be spaced from each other an amount dependent on the thickness of the brazing alloy and any metal welded or brazed thereto. The main parameter in these structures is the area of catalytically active surface exposed to the exhaust gas stream. FIG. 3 shows the core elements 10 in contiguous relation with generally diamond-shaped cell openings. When the corrugation pattern is chevron or herringbone, the cells will not be continuous or linear through the core, but rather nonlinear, and a mixed flow of the gas will result. Nevertheless, the back pressure is low and the contact with the catalytic surface is improved relative to straight cells. The cell density in such a contiguous layering assembly 30 is broadly from 50 to 700 cell openings per square inch, and preferably, from about 175 to 500 cells per square inch. The open area in such a structure is generally from about 80% to about 92%.

The corrugation pattern is preferably generally sinusoidal in cross section and has a herringbone pattern between the marginal edges of the thin metal strip. Other wave forms, e.g., triangular, or triangular with the apices rounded (approaching sinusoidal) may be used. Generally, the corrugations have an amplitude of from about 0.02" to about 0.25", and a pitch or wave length of from about 0.02" to about 0.2". In a chevron or herringbone pattern, the angle of deviation of the sides of the chevron from a line normal to the marginal edges of the thin metal strip is from about 3 degrees to about 10 degrees, i.e., the included angle defined by the chevron pattern or the herringbone pattern is from about 160 degrees to about 174 degrees. The length of the side of a chevron is from about 0.75" to about 1.25". The chevron or herringbone pattern is formed by passing the thin metal strip between corrugating gears from a leading edge to a trailing edge. The thin metal, preferably a ferritic stainless steel (e.g. Alfa-IV, a product of Allegheny Ludlum) has a thickness of from about 0.001" to about 0.05", 0.002" being a preferred thickness. The foil width is from 1.0" to 3.0", preferably about 2.00".

The thin metal desirably has a very thin coating of aluminum on the surfaces thereof, or contains aluminum as a part of the alloy (3% to 9% Al) as produced by the manufacturer. During heat treatment, a small fraction of the aluminum is oxidized and converted to alumina on the surface of the foil, a desired catalyst support base. Such a catalyst support base may also have coated on and adhered to it a wash coating or refractory metal oxide, e.g., alumina according to known techniques (see U.S. Pat. No. 4,711,009, supra). Other refractory metal oxides, or a mixture of two or more refractory metal oxides, can be used for the catalyst support base, e.g., silica, titania, zirconia, ceria, etc. In addition, rare earth metal oxides may be added to the wash coating composition as stabilizers for the alumina at high temperatures.

The preferred metal alloy for the corrugated metal strip is a ferritic stainless steel such as that described in U.S. Pat. No. 4,414,023 to Aggen et al dated Nov. 8, 1983, and consisting of about 20% chromium, 5% aluminum, 0.06% rare earth, balance iron and steel making impurities. Specific alloys consist essentially of 8.0% to 25% chromium, 3% to 9% aluminum, 0.002% to 0.05% of at least one rare earth metal selected from cerium, lanthanum, neodymium, and praseodymium, the total of the rare earths being up to 0.06%, up to 4% silicon, 0.06% to 1% manganese and normal steel making impurities of less than 0.05% carbon, less than 0.050% nitrogen, less than 0.020% oxygen, less than 0.040% phosphorus, less than 0.030% sulfur, less than 0.50% copper, less than 1% nickel, the sum of magnesium and calcium being less than 0.005%, the remainder being iron.

The brazing alloy hereof is desirably a nickel-bearing alloy analyzing 89% nickel, 11% phosphorus with a liquidus temperature of 1610 degrees F. A silver brazing alloy can also be used, the silver being alloyed for example, with copper, zinc and cadmium. Where platinum is used as the catalyst, phosphorus is avoided in the alloy. Other nickel containing brazing alloys containing 7% to 14% chromium, 3% to 4.5% iron, 3.5% to 4.5% silicon, and 2% to 3% boron, and having liquidus temperatures of 1630 degrees F. to 1950 degrees F. may also be used.

Welding of the core members 10 into a structure such as shown in FIG. 3 is desirably done by tungsten/inert gas (T.I.G.) welding, or multiple spot welding.

The present structure provides minimum voltage drop at the interconnections within the electrically heatable converter to the foil to be heated. There is also provided minimum voltage drop between the terminals of the electrically heatable converter and at the interconnections with both positive and negative electrodes. Also, there is zero voltage drop across contacting adjacent laminations.

What is claimed is:

1. An electrically heatable catalytic converter core comprising a plurality of thin stainless steel strips each of predetermined length and in superposed layers each of said plurality of strips having on each side thereof at least two spaced transversely extending bands of brazing alloy, said plurality of strips including between the at least two bands of brazing alloy, at least one contiguous area of corrugations, the at least two bands of brazing alloy being flat, said plurality of strips being layered so that the at least two bands containing brazing alloy of one layer are in electrical contact with the corresponding at least two bands of brazing alloy of the next layer, and means for applying a potential between the at least two spaced bands of brazing alloy, said at least one corrugated area having a thin coating of refractory metal oxide with a catalyst deposited thereon, and each of the at least two bands of brazing alloy being free of refractory metal oxide coating.

2. A catalytic converter in accordance with claim 1 wherein each side of said plurality of strips has three spaced transversely extending bands of brazing alloy, two bands located at the ends of each of said plurality of strips and one band centrally located, and means for applying electrical potential between the central strip of brazing alloy and each respective end strip of brazing alloy.

3. A catalytic converter core in accordance with claim 1 wherein the catalyst is a noble metal.

4. A catalytic converter core in accordance with claim 3 wherein the noble metal catalyst is selected from the group consisting of platinum, palladium, rhodium, ruthenium, and mixtures thereof.

5. A catalytic converter core in accordance with claim 1 wherein the corrugations have a generally triangular cross-sectional configuration.

6. A catalytic converter core in accordance with claim 1 wherein the corrugations are in a nonnesting pattern.

7. A catalytic converter core in accordance with claim 6 wherein the nonnesting pattern is a herringbone pattern.

8. An electrically heatable catalytic core in accordance with claim 1 further comprising a housing surrounding the core and inlet and outlet means for conducting a gas into and through the core.

* * * * *